US009652091B1

(12) United States Patent
Obeidat

(10) Patent No.: US 9,652,091 B1
(45) Date of Patent: May 16, 2017

(54) TOUCH SENSITIVE DISPLAY UTILIZING MUTUAL CAPACITANCE AND SELF CAPACITANCE

(71) Applicant: Amazon Technologies, Inc., Reno, NV (US)

(72) Inventor: Amjad Turki Obeidat, San Francisco, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 283 days.

(21) Appl. No.: 13/838,299

(22) Filed: Mar. 15, 2013

(51) Int. Cl.
*G06F 3/041* (2006.01)
*G06F 3/044* (2006.01)

(52) U.S. Cl.
CPC .................................. *G06F 3/044* (2013.01)

(58) Field of Classification Search
CPC .......... G06F 3/041; G06F 3/044; G06F 3/038; G09G 5/00; G09G 3/36
USPC ................................................. 345/156–184
See application file for complete search history.

(56) References Cited

U.S. PATENT DOCUMENTS

| | | | |
|---|---|---|---|
| 8,136,053 B1 | 3/2012 | Miller et al. | 715/863 |
| 8,243,027 B2 | 8/2012 | Hotelling et al. | 345/173 |
| 8,255,836 B1 | 8/2012 | Gildfind | 715/863 |
| 8,325,995 B1 | 12/2012 | Bowers et al. | 382/115 |
| 8,773,146 B1 * | 7/2014 | Hills | G01N 27/22 324/658 |
| 2008/0158185 A1 * | 7/2008 | Westerman | 345/173 |
| 2011/0025629 A1 * | 2/2011 | Grivna | G06F 3/0416 345/173 |
| 2013/0154996 A1 * | 6/2013 | Trend | H03K 17/9622 345/174 |
| 2013/0293507 A1 * | 11/2013 | Singh et al. | 345/174 |
| 2014/0015763 A1 * | 1/2014 | Woolley et al. | 345/173 |
| 2014/0049505 A1 * | 2/2014 | Radivojevic | G06F 3/04883 345/174 |
| 2014/0267067 A1 * | 9/2014 | Fuller et al. | 345/173 |

\* cited by examiner

*Primary Examiner* — Ilana Spar
*Assistant Examiner* — Nguyen H Truong
(74) *Attorney, Agent, or Firm* — K&L Gates LLP

(57) ABSTRACT

Systems and methods are provided for detecting gestures using both mutual capacitance and self capacitance touch sensing. These systems may be incorporated into devices utilizing an in-cell touch system, where the display controller is also used to drive the transmitter lines for mutual capacitance scans. The receiver lines can be used in conjunction with the transmitter lines for mutual capacitance sensing, or can be used alone for self capacitance sensing, even when the display controller is not operating, such as when the display is turned off. One-dimensional touch detection using the receiver lines alone can be used to generate different types of gesture inputs or to trigger body proximity sensing.

29 Claims, 7 Drawing Sheets

TOUCH SENSITIVE DISPLAY UTILIZING MUTUAL CAPACITANCE AND SELF CAPACITANCE

BACKGROUND

People are increasingly relying on computing devices, such as tablets and smart phones, which utilize touch sensitive displays. These displays enable users to enter text, select displayed items, or otherwise interact with the devices by touching and performing various movements with respect to the display screen, as opposed to other conventional input methods, such as using a mouse or directional keys on a keyboard. Many mobile computing devices include touch sensitive displays that can detect multiple touches, such as where a user uses two or more fingers to provide concurrent input. These multi-touch enabled devices are programmed to interpret the movement of multiple touches over a period of time as user inputs to perform certain functions, such as panning or zooming the image on the display.

The touch sensitive displays can utilize a variety of technologies for detecting user touches. In projected capacitance touch sensitive displays, an array of conductive sensors are distributed across the face of the computing device, typically covering the image displaying portion of the device. Two types of projected capacitance systems have been used: mutual capacitance and self capacitance.

Mutual capacitance touch sensitive displays typically utilize rows and columns of conductive lines which are used to detect changes in the capacitive coupling between pairs of conductive lines caused by the presence of a user's finger. Self capacitance touch sensitive displays detect the capacitive load caused by the presence of a user's finger near a single conductive sensor. Each type of capacitive touch technology can provide certain advantages that the other type does not. Accordingly, there is a need for improved methods and systems for implementing both mutual and self capacitive touch sensing technology within a single display.

DETAILED DESCRIPTION

In the following description, reference is made to the accompanying drawings which illustrate several embodiments of the present invention. It is understood that other embodiments may be utilized and mechanical, compositional, structural, and electrical operational changes may be made without departing from the spirit and scope of the present disclosure. The following detailed description is not to be taken in a limiting sense, and the scope of the embodiments of the present invention is defined only by the claims of the issued patent.

Systems and methods in accordance with various embodiments of the present disclosure may overcome one or more of the aforementioned and other deficiencies experienced in conventional touch sensitive displays. In particular, various approaches described herein enable devices utilizing an in-cell touch system to detect gestures using both mutual capacitance and self capacitance touch sensing. With in-cell touch systems, the display controller can be used to control the operation of the liquid crystal display for generating images as well as drive the transmitter lines for mutual capacitance scans. In accordance with embodiments described herein, receiver lines can be used in conjunction with the transmitter lines for mutual capacitance sensing, or can be used alone for self capacitance sensing, even when the display controller is not operating, such as when the display is turned off. One-dimensional touch detection using the receiver lines alone can be used to generate different types of gesture inputs or to trigger body proximity sensing.

Figures 2A, 2B:
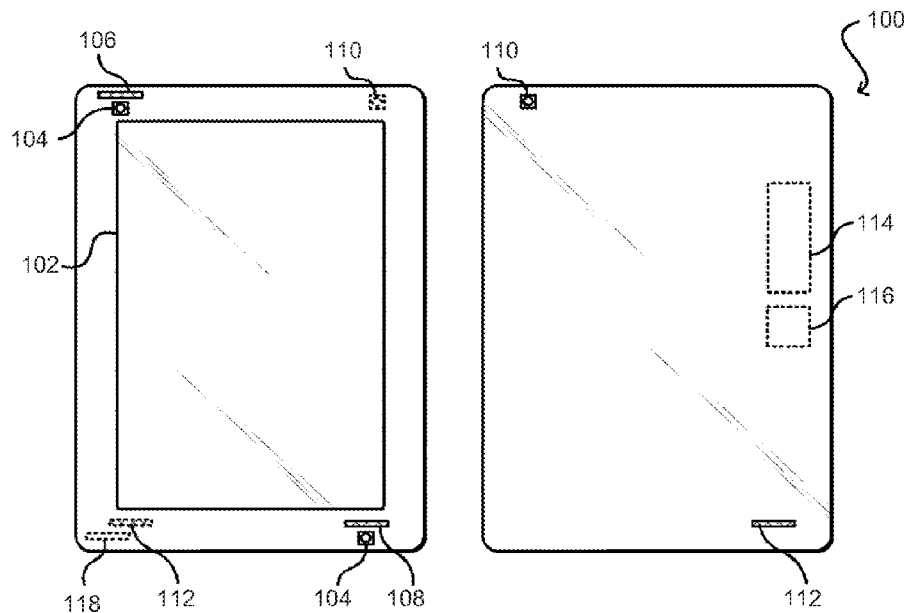
FIGS. 2A-2B illustrate front and back views, respectively, of an example computing device that can be used in accordance with various embodiments.

FIGS. 2A-2B illustrate front and back views, respectively, of an example computing device 100 that can be used in accordance with various embodiments. Although one example of a portable computing device is shown, it should be understood that various other types of computing devices that are capable of determining, processing, and receiving user input can be used in accordance with various embodiments discussed herein. The computing devices can include, for example, smartphones, electronic book readers, tablet computers, notebook computers, personal data assistants, cellular phones, video gaming consoles or controllers, television set top boxes and portable media players, among others.

In this example, the portable computing device 100 has a display 102 (e.g., a liquid crystal display (LCD) element) operable to display image content to one or more users or viewers of the device. In at least some embodiments, the display 102 provides for touch or swipe-based input using, for example, capacitive touch technology. Such a touch sensitive display can be used to, for example, enable a user to provide input by touching an area of the display corresponding to an image of a button, such as a right or left mouse button, touch point, etc.

The example computing device 100 can include one or more image capture elements for purposes such as image and/or video capture. The image capture elements can also be used for other purposes, such as to determine motion and receive gesture input. While the portable computing device in this example includes one image capture element 104 on the front of the device 100, as shown in FIG. 2A, and one image capture element 110 on the back of the device 100, as shown in FIG. 2B, it should be understood that image capture elements could also, or alternatively, be placed on the sides or corners of the device, and that there can be any number of image capture elements of similar or different types. Each image capture element may be, for example, a camera, a charge-coupled device (CCD), a motion detection sensor, an infrared sensor, or can utilize another image capturing technology.

The computing device 100 can also include at least one microphone or other audio capture element 106 capable of capturing audio data. In some devices there may be only one microphone 106, while in other devices there might be additional audio capture elements (e.g., microphone 108) on other sides and/or corners of the device 100, or in other appropriate locations. The computing device 100 may also include one or more audio speakers, such as speaker 112.

The computing device 100 may also include at least one motion, position or orientation determining element 118 operable to provide information such as a position, direction, motion, or orientation of the device. These elements can include, for example, accelerometers, inertial sensors, electronic gyroscopes, electronic compasses and GPS elements. Various types of motion or changes in orientation can be used to provide input to the device that can trigger at least one control signal for another device.

The computing device 100 may also include at least one communication interface 114, comprising one or more wireless components operable to communicate with one or more separate devices within a communication range of the particular wireless protocol. The wireless protocol can be any appropriate protocol used to enable devices to communicate wirelessly, such as Bluetooth, cellular, or IEEE 802.11. It should be understood that the computing device 100 may also include one or more wired communications interfaces for coupling and communicating with other devices. The computing device 100 may also include a power supply 116, such as, for example, a rechargeable battery operable to be recharged through conventional plug-in approaches, or through other approaches such as capacitive charging. Various other elements and/or combinations are possible as well within the scope of various embodiments.

Figure 3:
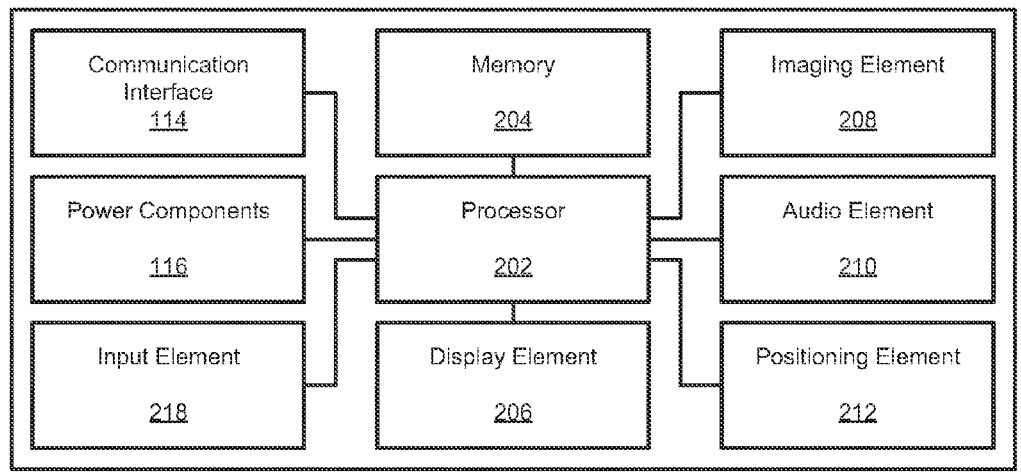
FIG. 3 illustrates an example set of basic components of a portable computing device.

FIG. 3 is an example block diagram illustrating basic components of a computing device, such as computing device 100, in accordance with embodiments of the present invention. In this example, the device 100 includes at least one processor 202 for executing instructions that can be stored in at least one memory device 204. As would be apparent to one of ordinary skill in the art, the memory device 204 can include one or more different types of memory, data storage or computer-readable storage media, such as, for example, a first data storage for program instructions for execution by the processor 202, a second data storage for images or data and/or a removable storage for transferring data to other devices.

The computing device 100 includes a touch sensitive display element 206, such as a light emitting diode (LED), electronic ink (e-ink), organic light emitting diode (OLED) or liquid crystal display (LCD).

The computing device 100 may include an imaging element 208, such as one or more cameras configured to capture an image of people or objects in the vicinity of the device 100. In at least some embodiments, the computing device 100 can use the image information detected by the imaging element 208 to determine gestures or motions of the user, which will enable the user to provide input through the portable device without having to actually contact and/or move the portable device. The imaging element 208 also can be used to determine the surroundings of the computing device 100. The imaging element 208 can include any appropriate technology, such as a CCD image capture element having a sufficient resolution, focal range and viewable area, to capture the desired images, such as an image of the user when the user is operating the device 100.

The computing device 100 may also include an audio element 210, such as one or more audio speakers 112 and/or microphones 106, 108, as described above. The microphones 106, 108 may be used to facilitate voice-enabled functions, such as voice recognition, digital recording, etc. The audio speakers 112 may perform audio output. In some embodiments, the audio speaker(s) may reside separately from the device. The computing device 100 may also include a positioning element 212, such as motion, position or orientation determining element 118, that provides information such as a position, direction, motion, or orientation of the device 100. This positioning element 212 can include, for example, accelerometers, inertial sensors, electronic gyroscopes, electronic compasses or GPS elements.

The computing device 100 can include one or more input elements 218 operable to receive inputs from a user. The input elements 218 can include, for example, a push button, touch pad, touch screen (such as display 102), wheel, joystick, keyboard, mouse, trackball, keypad or any other such device or element whereby a user can provide inputs to the computing device 100. These input elements 218 may be incorporated into the computing device 100 or operably coupled to the computing device via wireless interface.

The input elements 218 also include a touch controller, which can be, for example, a low power microcontroller dedicated to sensing touches and/or objects in proximity to or in contact with the display 102. The touch controller is configured to analyze the changes in capacitance and/or electric field in order to detect the presence and location of objects in proximity of the display 102. For touch sensitive displays, the input elements 218 may be integrated into the display element 206.

Figure 1:
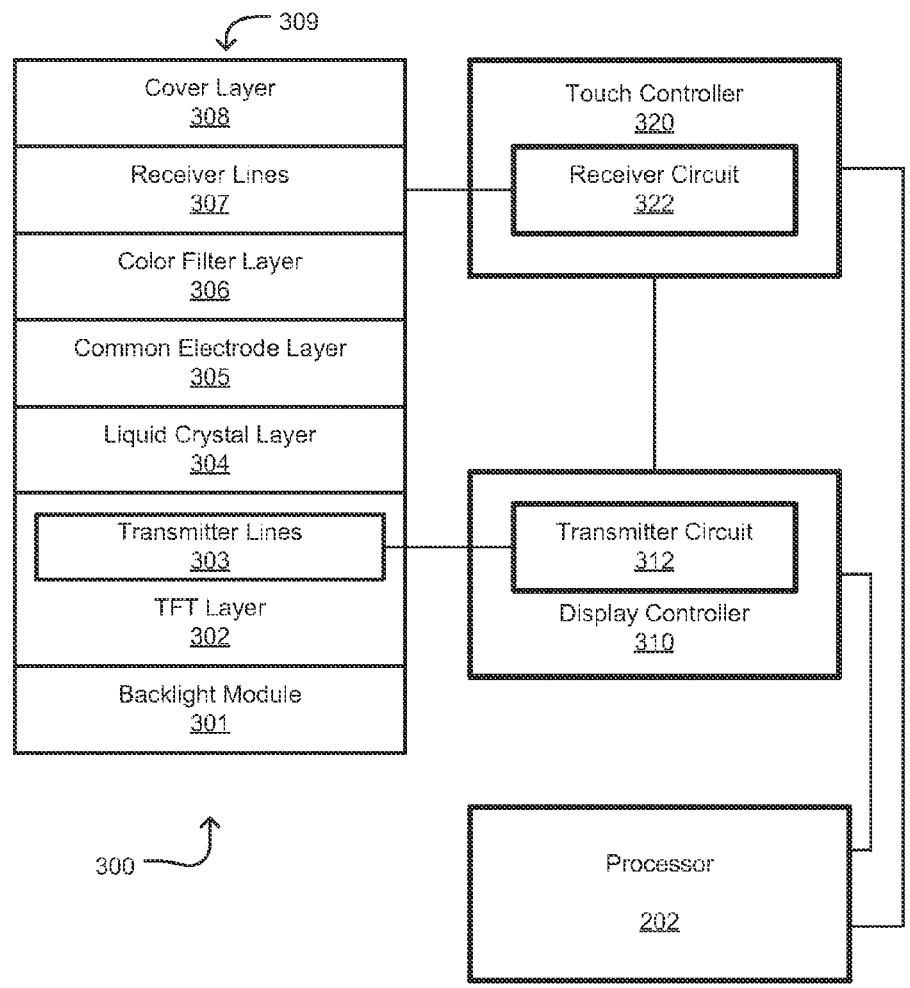
FIG. 1 illustrates a block diagram of a touch sensitive display, in accordance with various embodiments.

FIG. 1 is a block diagram illustrating elements of a touch sensitive display, in accordance with various embodiments. The display includes a display panel 300, a touch controller 320, and a display controller 310. The controllers described herein may be implemented in a variety of ways, such as, for example, a general purpose microcontroller or microprocessor programmed for display and/or touch sensing functionality, a specialized microcontroller or discrete hardware components.

The embodiment in FIG. 1 illustrates an in-cell touch system, but other embodiments may utilize other touch sensitive configurations. It is to be understood that additional layers and components are used in touch sensitive displays but are omitted from FIG. 1 for clarity, and in various embodiments, layers illustrated in FIG. 1 may comprise multiple sub-layers or other components, be arranged in a different order, or be omitted altogether, and that the various elements illustrated in FIG. 1 are not drawn to scale.

A backlight module 301 directs light through the subsequent layers of the display panel 300 to generate the image viewed by the user. Next is a TFT layer 302 comprising transparent conductive leads, typically comprising indium-tin oxide (ITO). These ITO leads are driven by the display controller 310 to activate thin film transistors (TFT) in the TFT layer 302. The TFTs, in conjunction with an ITO common electrode on the common electrode layer 305, control the orientation of the liquid crystal molecules in the liquid crystal layer 304, which, in turn, control the passage of light from the backlight module 301 through the display panel 300.

The color filter layer 306 contains colored subpixel filters, typically formed on a glass substrate. The upper surface of the cover layer 308 forms the touch surface 309, which comprises the outer face of the display 102 that is viewed and touched by users when operating the device 100. The cover layer 308 may comprise multiple layers, such as an anti-reflective coating and a protective layer, which may comprise glass, plastic, or other substantially transparent material.

Light from the backlight module 301 is linearly polarized by a first polarizer, and is then further polarized by the liquid crystal molecules responding to the applied electric field generated by the TFT layer 302 under control of the display controller 310. The subpixel filters in the color filter layer 306 add colors to the image, which is viewable on the touch surface 309.

The TFT layer 302 may include an array of ITO scan lines that are driven by the display controller 310 to generate the image being displayed. In conventional mutual capacitance touch sensitive displays, two sets of ITO lines (typically arranged in rows and columns, but alternatively arranged in different configurations) are disposed between the color filter layer and the touch surface, with the two sets being separated by an insulating layer, such as a thin film separator. In these systems, both sets of ITO lines used for touch sensing are located outside of the display cell. These rows and columns are both controlled by the touch controller 320 to sense the mutual capacitance changes caused by user touches. In contrast, in-cell systems utilize conductive lines contained somewhere within the display cell, e.g., between the color filter layer and the TFT layer. The in-cell conductive lines are used for mutual capacitance measurements in place of one of the externally-located sets of ITO lines. The second set of ITO lines can be positioned outside of the display cell (as illustrated in FIG. 1) or can be positioned inside of the display cell as well, such as, for example, on the inside surface of the color filter layer 306.

In some cases, the VCOM lines in the TFT layer used by the display controller 310 for driving the TFTs for displaying images are also used as driver lines for mutual capacitance measurements by the touch controller 320. In these systems, receiver lines 307 are provided between the color filter layer 306 and the touch surface 309 for mutual capacitance measurements with the VCOM lines in the TFT layer 302. A transmitter circuit 312 in the display controller 310 utilizes these in-cell ITO lines as transmitter lines 303 for capacitance measurements at the receiver lines 307 by a receiver circuit 322 in the touch controller 320. Thus, the display controller 310, which is typically used for controlling the TFTs for generating images on the display, is also used to drive the transmitter lines 303 for mutual capacitance touch sensing measurements under the control of the touch controller 320. In these embodiments, the display controller 310 can be configured to interleave its display generation operations with its touch sensing operations to enable the device 100 to both display images and receive touch inputs at the same time.

For most touch sensitive mobile computing devices, the resolution of the images is much higher than the resolution of the touch sensitivity. Accordingly, there are typically far more scan lines used for control of the individual TFTs than would be used as transmitter lines for mutual capacitance measurements, and each scan line would be separately driven by the display driver. For example, in a computing device having a high definition display, the display may have many hundreds or thousands of columns and rows of ITO lines for TFT control, but the number of columns and rows of ITO lines used for touch sensing capacitance measurements would typically be an order of magnitude less, such as, for example, 12 columns and 20 rows of electrodes. In this case, when performing mutual capacitance measurements, the display driver would group a plurality of adjacent ITO lines together and drive each group collectively, such that each group of lines would effectively function as a single transmitter electrode.

The touch controller 320 transmits control signals to the display controller 310, which in turn causes the transmitter circuit 312 to apply a driving voltage to the transmitter lines 303. A user bringing a finger close to, or in contact with, the touch surface 309 can cause a change in the local electrostatic field around the area of the touch, thus reducing the mutual capacitance at the capacitors at or near the area of the touch. The capacitance change at each capacitor point can be determined by measuring the voltage on receiver lines 307 using the receiver circuit 322 of the touch controller 320. The touch controller 320 can determine the appropriate input information, including information such as number, location, approximate size, and duration of a touch, and can provide that information to an application executing on at least one processor (e.g., processor 202) of the device 100.

Mutual capacitance can enable accurate multi-touch operation, such that a user can provide concurrent input using multiple fingers or objects, but such an approach frequently draws significantly more power than a self capacitance approach. In addition, the use of the display controller 310 to drive transmitter lines 303 for in-cell systems can result in even greater power consumption. Typically, the display controller 310 will consume more power than a touch controller 320 because the display controller 310 drives far more lines than the touch controller 320 and the transfer of each frame of data to drive the transmitter lines 303 consumes more power than the transfer of each frame of data to drive the far smaller number of receiver lines 307. In addition, the display controller 310 typically runs at a higher voltage than the touch controller 320 due to the voltage requirements for switching the liquid crystal molecules for image generation. This difference in power consumption is particularly significant for battery powered mobile computing devices, such as smartphones and tablets.

Figure 4:
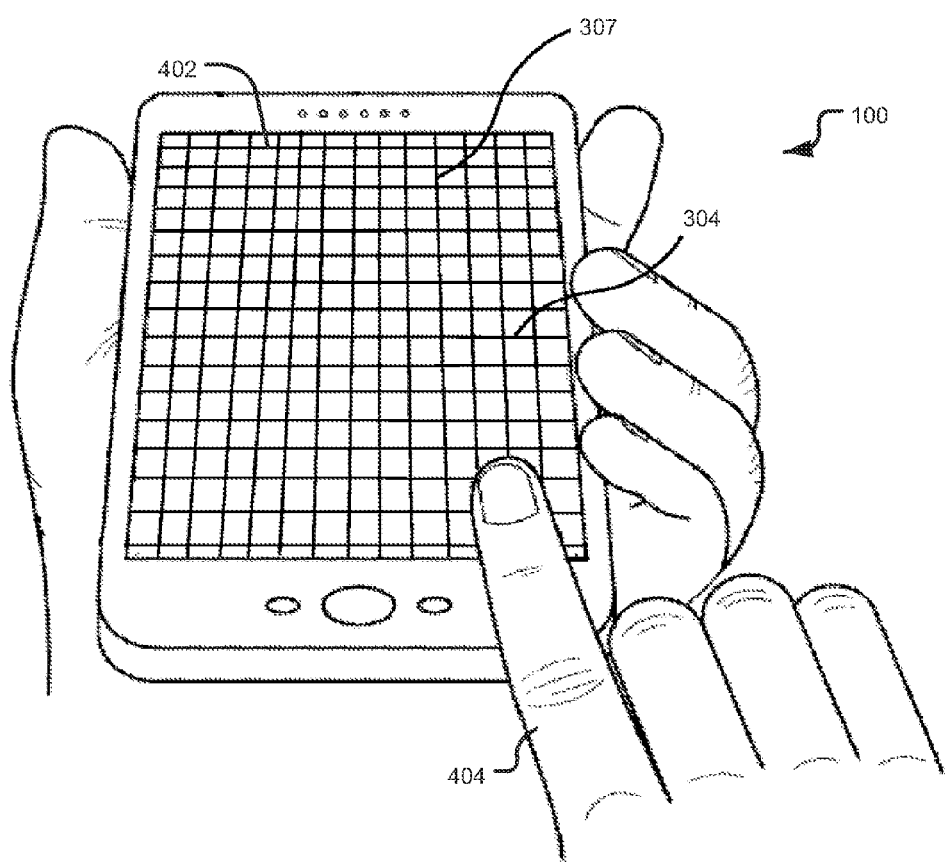
FIG. 4 illustrates an example of a portable computing device utilizing a grid of sensor lines for detecting objects coming in contact with the touch screen display, in accordance with various embodiments.

FIG. 4 illustrates an example of a portable computing device 100 utilizing a grid of sensor lines that can be used to detect objects coming in contact with the touch-sensitive display panel 300, in accordance with various embodiments. In the illustrated embodiment, the sensor lines are arranged in a grid formation 402 that includes a plurality of parallel rows and a plurality of parallel columns orthogonal to the rows. In the illustrated example, the rows comprise the receiver lines 307 and the columns comprise transmitter lines 304, but in other embodiments, the arrangement of receiver lines 307 and transmitter lines 304 may vary. The grid formation 402 can cover all or a portion of the display panel 300 of the computing device 100. The sensor lines are depicted in FIG. 4 for illustrative purposes, but it is to be understood that the grid of sensor lines may comprise transparent ITO lines located below the touch surface 309, and would not be visible to the user. In addition, the lines need not be linear or arranged in an orthogonal grid.

As described above, in accordance with embodiments implementing touch sensitive display panels 300, the columns of the grid 402 are configured to be transmitter lines 304 that transmit an electronic signal (e.g., emit an electric field) and the rows are configured as receiver lines 307 that receive the electronic signal. When a conductive object, such as a finger 404, contacts or is in close proximity to the display panel 300, the object reduces the amount of signal that the receiver line 307 is receiving. Based on such reduced signal being detected, the touch controller 320 can determine the location of the object on the screen at the intersection of the transmitter and receiver. Mutual capacitance thus enables the controller to determine the locations of multiple touches based on changes in capacitance at each intersection.

In accordance with embodiments of the present invention, the touch sensitive display panel 300 described above can also be operated in a self capacitive touch sensing mode. When performing self capacitive touch sensing, the touch controller 320 measures the capacitance of individual receiver lines 307 with respect to ground. Each individual receiver line 307 is treated as a conductive plate. The transmitter lines 303 are not used during self capacitive touch sensing operations. When an object, such as a finger 404, comes into close proximity with the sensor lines, the capacitance of the object is added to the capacitance of the receiver line 307. The receiver line 307 thus sees an increase in capacitance, which is detected by the touch controller 320.

Figure 5:
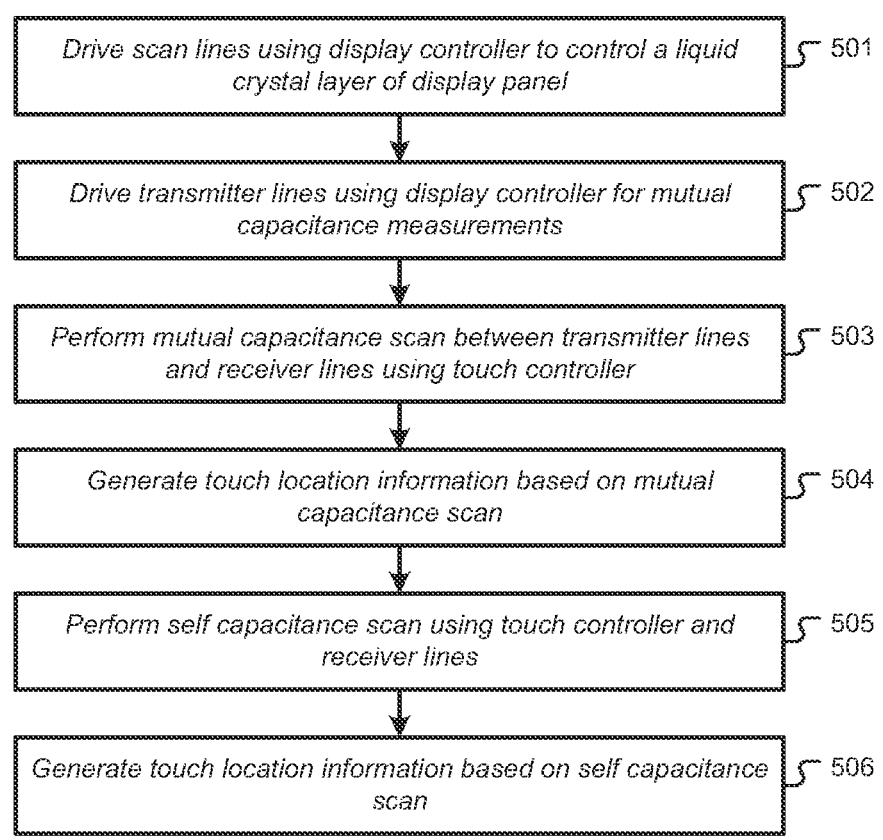
FIG. 5 illustrates a method of operating a touch sensitive display, in accordance with various embodiments.

FIG. 5 illustrates a method of operating a touch sensitive display to perform both mutual capacitance touch sensing and self capacitance touch sensing, in accordance with various embodiments. In operation 501, a display controller is used to drive scan lines to control a liquid crystal layer of a display panel to produce images on the display panel. In operation 502, the display controller is used to drive transmitter lines for mutual capacitance measurements. In operation 503, a mutual capacitance scan is performed between the transmitter lines and the receiver lines using a touch controller. In operation 504, touch location information based on the mutual capacitance scan is generated. In operation 505, a self capacitance scan is performed using the touch controller. In operation 506, touch location information based on the self capacitance scan is generated.

With reference to the embodiment shown in FIG. 1, in a mutual capacitance mode, the transmitter circuit 312 of the display controller 310 is used to drive the transmitter lines 303 for touch sensing operations and to drive the lines to control the liquid crystal layer 304 to generate images on the display 300. The receiver circuit 322 of the touch controller 320 performs mutual capacitance measurements on the receiver lines 307. The computing device 100 can then be operated in a self capacitance mode in which the display controller 310 is no longer used, and the touch controller 320 performs self capacitance measurements using only the receiver lines 307.

Various embodiments implementing the methods and systems described herein can provide numerous advantages over conventional touch sensitive displays. For example, because the display controller 310 performs mutual capacitance operations under the control of the touch controller 320, it is not necessary for the display controller 310 to be specifically programmed for touch sensing operations. Instead, conventional, off-the-shelf display controllers may be utilized, which can decrease the cost of the device 100. The touch controller 320 can be programmed to generate and transmit the appropriate control signals to the display controller 310 to cause the display controller 310 to drive the transmitter lines 303 for mutual capacitance measurements. The function of driving of the transmitter lines 303 for mutual capacitance measurements is substantially similar to the function of driving the ITO lines for image creation, so a specialized display controller 310 may not be required. In addition, because the display controller 310 is not utilized for self capacitance measurements, the device 100 can be configured to receive touch inputs using self capacitance touch sensing even when the display controller 310 is not active, such as when the display is turned off and no image is being displayed. This can result in a considerable reduction in power consumption.

Figure 6:
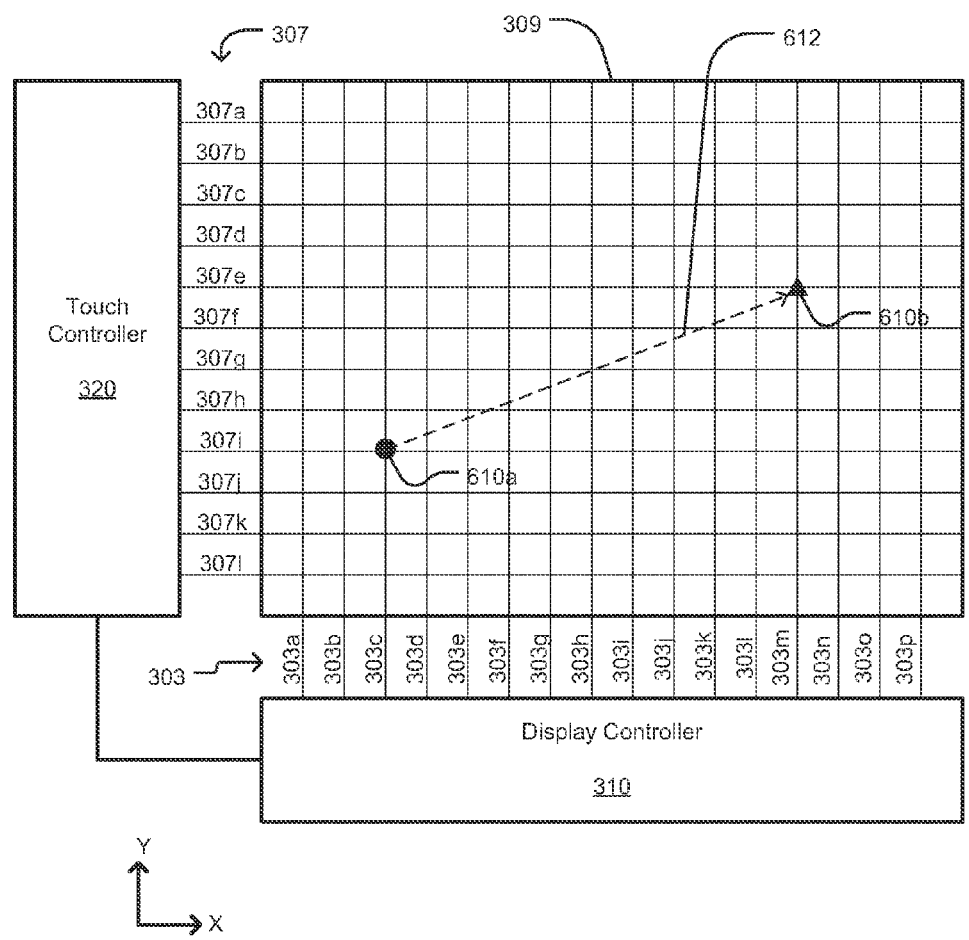
FIG. 6 illustrates touch detection in a touch sensitive display, in accordance with various embodiments.

FIG. 6 illustrates touch detection in a touch sensitive display, in accordance with various embodiments. In the orientation illustrated in FIG. 6, the transmitter lines 303 are oriented as columns and the receiver lines 307 are oriented as rows. The orthogonal arrangement of rows and columns permits the touch controller 320 to identify a touch location anywhere in the two-dimensional touch surface 309. Location 610a represents a first point of contact by a user's finger 404 and location 610b represents the final point of contact by the user's finger 404 after it is swiped across the touch surface 309 along path 612.

When operating in mutual capacitance mode, the touch controller 320 is configured to locate the first contact point 610a by detecting the mutual capacitance change at the intersection of receiver line 307i and transmitter line 303c. Similarly, the touch controller 320 can locate the second contact point 610b at the intersection of receiver line 307e and transmitter line 303m, and all intermediate contact points along path 612 by sensing the mutual capacitance changes at the nearest corresponding intersections.

When operating in self capacitance mode, the display controller 310 and transmitter lines 303 are not used. As a result, the touch controller 320 can detect the self capacitance change on receiver line 307i, but is not able to determine the location along receiver line 307i where the contact 610a is made. Similarly, when the user's finger is at contact point 610b, the touch controller 320 can only determine that the touch is located somewhere along receiver line 307e. In other words, when in self capacitance mode using a single set of substantially linear lines as shown in FIG. 6, the touch controller 320 can only detect touch locations along the y-axis, but cannot determine touch locations in the x-direction. As a result, when in self capacitance mode the touch controller 320 generates only one-dimensional touch location information for use by the operating system or applications running on the computing device 100.

The one-dimensional touch location capability provided by the self capacitance mode described above could be of limited use if utilized for conventional touch screen operation with the user interacting with a two-dimensional touch surface 309, as two-dimensional touch surfaces typically require two-dimensional touch location capability to provide an effective user experience. However, the one-dimensional touch location capability can still provide useful functionality, as described in greater detail below, while also providing the power consumption and cost savings described above.

The computing device 100 can be programmed to respond to various one-dimensional user touch inputs, such as a touch or swipe in the direction of sensitivity (e.g., the y-direction in the embodiment illustrated in FIG. 6). The device 100 can also be programmed to respond to the direction of touch movement. For example, as shown in FIG. 6, a swipe from top to bottom in the y-direction may be interpreted as a first command, while a swipe from bottom to top may be interpreted as a second command.

The computing device 100 can also be programmed to respond to a size of a touch contact area. For example, the device 100 may be configured to estimate a number of fingers touching the display based on a width of a touch contact patch. The detection of a single finger, as suggested by a touch contact patch having a width approximating an average human finger, may be interpreted as a first command, while the detection of two or more fingers, as suggested by a touch contact patch having a width approximating multiple human fingers, may be interpreted as a different command.

Figure 7:
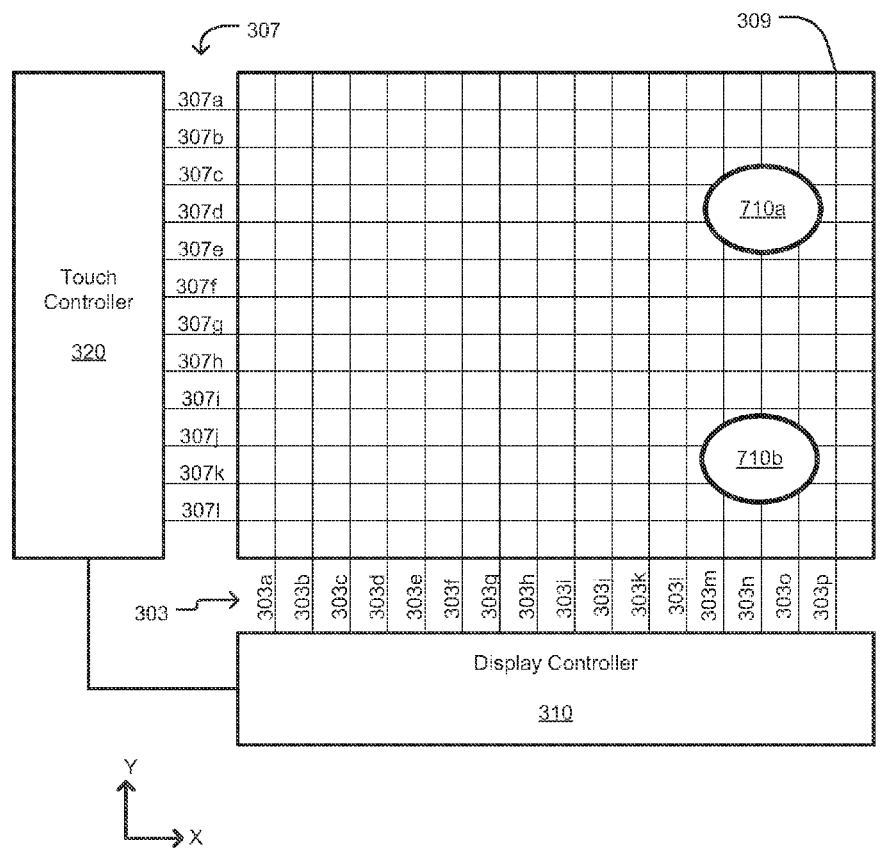
FIG. 7 illustrates touch detection of multiple touch contact areas in a touch sensitive display, in accordance with various embodiments.

The computing device 100 can also be programmed to respond to multiple touch contact areas across the direction of sensitivity. FIG. 7 illustrates touch detection of multiple touches, in accordance with various embodiments. In this illustrated example, two contact areas 710a-710b are detected on the touch surface 309. These contact areas 710a-710b may represent the touches detected when a user places two fingers onto the display along an edge of the device 100. When performing mutual capacitance touch detection, the touch controller 320 can identify the two-dimensional locations of the regions encompassed by each of the contact areas 710a-710b. When performing self capacitance touch detection using the receiver lines 307 alone, the touch controller 320 will detect a touch along receiver lines 307c-307d and receiver lines 307j-307k, but will not be able to determine the touch location in the x-direction. However, based on the width of the contact areas 710a-710b in the y-direction, the device 100 may interpret this pattern as a predefined two-finger touch user input pattern having a corresponding command associated with it.

The computing device 100 can also be programmed to respond to a time series of one-dimensional touch inputs, such as, for example, multiple taps (e.g., double-tap, triple-tap, etc.), a predetermined rhythm or timing of multiple taps (e.g., a "shave and a haircut" knocking rhythm), a combination of taps and swipes, or a combination of taps and swipes in a predetermined rhythm or timing. These one-dimensional inputs may occur in substantially the same location on the display, in different locations on the display, or in a specified region of the display. Each of these predetermined sequences can be interpreted as different commands.

Figure 8:
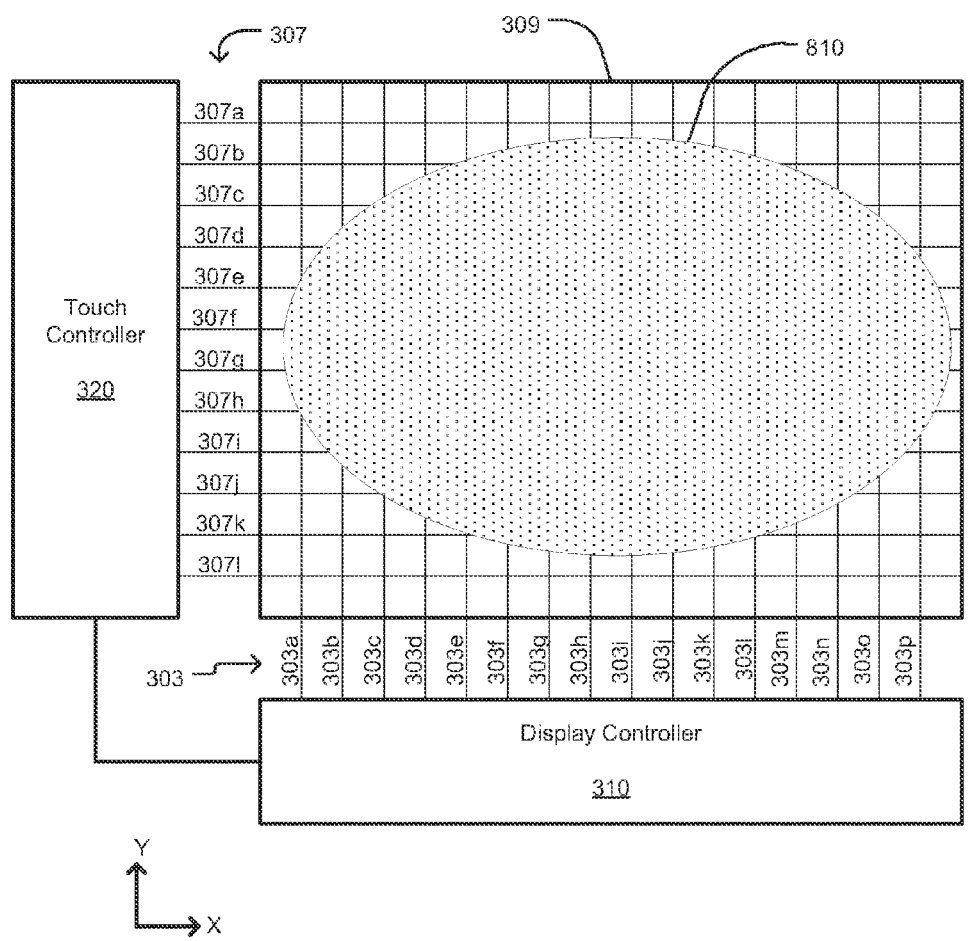
FIG. 8 illustrates touch detection of a large contact patch in a touch sensitive display, in accordance with various embodiments.

FIG. 8 illustrates another form of touch detection in a touch sensitive display. In this illustrated example, a large contact area 810 touches or is positioned in close proximity to the touch surface 309. When performing mutual capacitance touch detection, the touch controller 320 can identify the entire two-dimensional region encompassed by the contact area 810. When performing self capacitance touch detection, the touch controller 320 will detect a touch along receiver lines 307b-307k, but will not be able to determine the touch location in the x-direction. However, self capacitance touch detection is typically more sensitive than mutual capacitance touch detection, so the touch controller 320 may detect the presence of a user's finger or hand even when the finger or hand is not in direct contact with the touch surface 309.

The ability to detect this type of large contact area touch can be utilized in various ways. For example, this touch sensitivity can be used to cause the computing device to enter into a body proximity state, during which certain features and/or functions may be disabled. Many computing devices provide audio functionality, such as the ability to make telephone calls, receive voice commands, or record audio, and many conventional smartphones include special sensors for detecting face proximity during telephone calls. In accordance with embodiments of the present invention, if an audio function is being executed (e.g., a telephone call is in progress), the device 100 may be programmed to interpret the detection of a large contact area touch (e.g., a contact area substantially larger than a fingertip) as an indication that the user has placed the device 100 next to the user's cheek. This can cause the device 100 to enter into a body proximity state, during which the device 100 may turn off the display and/or terminate touch input responses until the large contact area is no longer detected. The turning off of the display may comprise turning off or dimming the backlight only, or completely turning off all image generation. This can eliminate the need for additional light sensors or other proximity detectors commonly used for detecting when a user is holding a smartphone next to the user's face to place a telephone call.

The device 100 may also be programmed to deactivate the display controller 310 in response to a large contact area touch such that mutual capacitance touch sensing is temporarily disabled. The self capacitance touch sensing functionality, which is less power consumptive, can continue until the large contact area touch is no longer detected. At that point, the device 100 can reactivate the display controller 310 to turn the display back on and restart two-dimensional mutual capacitance touch sensing.

The large contact area touch detection can also be used to indicate that the device 100 has been placed into the user's pocket. For example, if all or substantially all of the receiver lines 307 detect the presence of a user touch, then the device 100 may be configured to enter a "pocket mode" which assumes that the user has placed the device 100 into a pocket and does not wish to enter any touch inputs. While in "pocket mode," the display may be turned off, the display controller 310 may be deactivated, all other touch inputs will be disregarded and/or the device 100 is put into "sleep mode". The device 100 may be further programmed to automatically awake from "pocket mode" when the large contact area touch is no longer detected, or is not detected for a predetermined period of time (e.g., one second or several seconds). Alternatively, the device 100 may be programmed to remain in "pocket mode" or sleep mode until another predetermined user input is received, such as, for example, a user press of a physical button on the device 100 or a predefined user input pattern is detected (e.g., a one-dimensional swipe or temporal series of predefined one-dimensional inputs, as described above).

As described above, self capacitance touch detection can be more sensitive than mutual capacitance touch detection. This can be utilized for interpreting user inputs based on detection of a finger or palm that is held close to but not in contact with the touch surface 309. The touch controller 320 may also be configured to detect a magnitude of self capacitance change based on the distance of the user's finger or palm from the touch surface 309, as indicated by the signal strength detected during self capacitance scans. The detection of a finger or palm held in close proximity to but not in contact with the touch surface 309 can be interpreted as a distinct user input from an actual touch. This may be interpreted as a "hover" input such that the detection of a user hovering his or her palm close to the surface of the touch surface 309 for a period of time can be interpreted as a particular command associated with the hover.

In some embodiments, the detection of a hover input may be accomplished using both self capacitance and mutual capacitance sensing. For example, because self capacitance sensing typically has a much higher sensitivity than mutual capacitance, if a user's finger is hovering over but not contacting the surface of the display, the self capacitance scan can detect the presence of the finger, but the mutual capacitance scan may not. As a result, when the touch controller detects a touch with the self capacitance scan but not with the mutual capacitance scan, the touch controller can identify the hovering finger and generate a corresponding user input.

The one-dimensional self capacitance touch sensing may also be utilized for other functions. For example, the device 100 may be used as a remote control for a television. In this case, even if the display of the device 100 is turned off, a predefined one-dimensional user input pattern may be interpreted by the device 100 as a user input requesting various functions, such as turning the television on or off, adjusting the volume, muting the volume, changing the channel, etc.

In accordance with various embodiments of the present invention, the self capacitance scans may be performed at different times during operation of the computing device. In examples described above, it may be desirable to perform self capacitance touch sensing scans at times when the display on the device is turned off and the display controller is not in operation. In other embodiments, self capacitance scans may be interleaved with other display operations that could interfere with the self capacitance sensing. For example, interference may be caused by the electromagnetic fields generated by pixel control scans used to control the orientation of the liquid crystals in the liquid crystal layer. Therefore, it may be desirable to interleave the self capacitance scans with image generating operations, such that the self capacitance scans are performed during either horizontal or vertical blanking periods. The mutual capacitance scans may also be interleaved with the self capacitance scans and the image generating operations. Because the signal-to-noise performance of capacitance sensing is improved with increased sensing periods, particularly for self capacitance sensing, it may be desirable to maximize the amount of time available to perform capacitance sensing operations.

Embodiments of the present invention may provide various advantages not provided by prior art systems. The ability to switch to a self capacitance touch sensing mode under certain situations where two-dimensional touch sensing is not needed can reduce power consumption and permit the use of standard off-the-shelf display controllers with in-cell projected-capacitance touch displays.

While the invention has been described in terms of particular embodiments and illustrative figures, those of ordinary skill in the art will recognize that the invention is not limited to the embodiments or figures described. For example, in many of the embodiments described above, in-cell touch detection is implemented utilizing the same ITO lines used for image generation. In other embodiments, dedicated sensor lines may be used for touch sensing.

Some portions of the detailed description which follows are presented in terms of procedures, steps, logic blocks, and processing other symbolic representations of operations on data bits that can be performed on computer memory. Each step may be performed by hardware, software, firmware, or combinations thereof.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A touch sensitive computing device, comprising:
   a liquid crystal display panel comprising a thin film transistor (TFT) layer, a color filter layer, and a liquid crystal layer positioned between the TFT layer and the color filter layer;
   a plurality of electrically conductive transmitter lines positioned on the TFT layer and extending in a first direction;
   a plurality of electrically conductive receiver lines positioned on the color filter and extending in a second direction different from the first direction;
   a display controller comprising a transmitter circuit operably coupled to the transmitter lines, said display controller configured to drive the transmitter lines to control the liquid crystal layer;
   a touch controller comprising receiver circuit operably coupled to the receiver lines and operably coupled to the display controller, said touch controller configured to:
      when displaying an image on the liquid crystal display panel, operate in a mutual capacitance mode by instructing the display controller to drive the transmitter lines for mutual capacitance measurements, detecting in the receiver lines mutual capacitance changes between the receiver lines and the transmitter lines, and generating two-dimensional touch location information based on the detected mutual capacitance changes in the receiver lines; and
      when no image is displayed on the liquid crystal display panel, operate in a self capacitance mode by detecting self capacitance changes in the receiver lines and generating one-dimensional touch location information based on the self capacitance changes detected in the receiver lines, wherein the touch controller does not generate two-dimensional touch location information in the self capacitance mode; and
   at least one processor programmed to respond to the one-dimensional touch location information generated by the touch controller in the self capacitance mode.

2. The touch sensitive computing device of claim 1 wherein said touch controller is configured to operate in the mutual capacitance mode when the computing device is displaying an image with the liquid crystal display panel and is configured to operate in the self capacitance mode when the computing device is not displaying an image with the liquid crystal display panel.

3. The touch sensitive computing device of claim 1 wherein said touch controller is configured to operate in the self capacitance mode when the display controller is not driving the transmitter lines.

4. A computing device, comprising:
   a liquid crystal display panel;
   a first plurality of electrodes;
   a second plurality of electrodes;
   a display controller comprising a transmitter circuit operably coupled to the first plurality of electrodes, said display controller configured to drive the first plurality of electrodes; and
   a touch controller comprising a receiver circuit operably coupled to the second plurality of electrodes and to the display controller, said touch controller configured to:

when displaying an image on the liquid crystal display panel, operate in a mutual capacitance mode by instructing the display controller to drive the first plurality of electrodes for mutual capacitance measurements, detecting in the second plurality of electrodes mutual capacitance changes between the first and second plurality of electrodes, and generating touch location information based on the detected mutual capacitance changes between the first and second plurality of electrodes; and when no image is displayed on the liquid crystal display panel, operate in a self capacitance mode by detecting self capacitance changes in the second plurality of electrodes and generating one-dimensional touch location information based on the self capacitance changes detected in the second plurality of electrodes, wherein the touch controller does not generate two-dimensional touch location information in the self capacitance mode; and at least one processor programmed to respond to the one-dimensional touch location information generated by the touch controller in the self capacitance mode.

5. The computing device of claim 4, wherein said touch controller is configured to:

generate two-dimensional touch location information based on the detected mutual capacitance changes between the first and second plurality of electrodes.

6. The computing device of claim 5, further comprising a processor configured to execute functions in response to receipt of the one-dimensional touch location information from the touch controller during periods when no images are being displayed by the liquid crystal display panel.

7. The computing device of claim 4, wherein:

said second plurality of electrodes comprises a plurality of substantially linear electrodes arranged in a first direction; and said touch controller is configured to generate swipe gesture information in response to a sequential detection of self capacitance changes in adjacent electrodes in the second plurality of electrodes over a period of time.

8. The computing device of claim 4, wherein said touch controller is configured to generate touch gesture information in response to detection of self capacitance changes in a set of adjacent electrodes in the second plurality of electrodes for a period of time.

9. The computing device of claim 4, wherein said display controller is configured to drive the first plurality of electrodes to control a liquid crystal layer in the liquid crystal display panel.

10. The computing device of claim 9, wherein said touch controller is configured to operate in the self capacitance mode while the display controller is not driving the first plurality of electrodes to control the liquid crystal layer.

11. The computing device of claim 4, wherein said touch controller is configured to operate in the self capacitance mode while the display controller is not driving the first plurality of electrodes for mutual capacitance measurements.

12. The computing device of claim 4, wherein said touch controller is configured to continue operating in the self capacitance mode while images are not being produced by the liquid crystal display panel.

13. The computing device of claim 4, wherein:

said liquid crystal display panel comprises a plurality of layers including a thin film transistor (TFT) layer; and said first plurality of electrodes are provided in the TFT layer.

14. The computing device of claim 13, wherein said plurality of layers in the liquid crystal display panel further includes:

a color filter layer, said second plurality of electrodes being positioned on the color filter layer; and a liquid crystal layer positioned between the TFT layer and the color filter layer.

15. The computing device of claim 4, wherein said computing device is configured to remain in a body proximity state while the touch controller is detecting self capacitance changes indicating proximity to a user's body over a minimum threshold region.

16. The computing device of claim 15, wherein said computing device is configured to remain in a body proximity state while the touch controller is detecting self capacitance changes across substantially all of the second plurality of electrodes.

17. The computing device of claim 15, wherein said body proximity state comprises a state in which the computing device does not produce images on the display panel and does not drive the first plurality of electrodes for mutual capacitance measurements.

18. The computing device of claim 4, wherein said computing device is configured to wake from a sleep mode when the touch controller detects self capacitance changes indicative of a predefined user input pattern.

19. The computing device of claim 18, wherein said predefined user input pattern comprises a one-dimensional swipe or a temporal series of predefined one-dimensional inputs.

20. A method of operating a computing device with a processor and a liquid crystal display panel having a first and second plurality of electrodes, comprising:

driving, by a display controller, a first plurality of electrodes to control a liquid crystal layer in the liquid crystal display panel;

driving, by the display controller, the first plurality of electrodes for mutual capacitance measurements;

when displaying an image on the liquid crystal display panel, performing a mutual capacitance scan between the first plurality of electrodes and a second plurality of electrodes using a touch controller;

generating, by the touch controller, touch location information based on mutual capacitance changes detected between the first and second plurality of electrodes;

when no image is displayed on the liquid crystal display panel, performing a self capacitance scan using the touch controller and the second plurality of electrodes; and generating, by the touch controller, one-dimensional touch location information based on self capacitance changes detected in the second plurality of electrodes in said self capacitance scan and not generating two-dimensional touch location information based on self capacitance changes; and responding, by the processor, to the one-dimensional touch location information generated by the touch controller based on self capacitance changes.

21. The method of claim 20, wherein:

said generating touch location information based on mutual capacitance changes comprises generating two-dimensional touch location information based on the detected mutual capacitance changes between the first and second plurality of electrodes.

22. The method of claim 20, further comprising instructing the display controller to cease driving the first plurality of electrodes when the touch controller is performing the self capacitance scan.

23. The method of claim 20, further comprising instructing the display controller to cease driving the first plurality of electrodes for mutual capacitance measurements when the touch controller is performing the self capacitance scan.

24. The method of claim 20, further comprising:
in response to detecting self capacitance changes indicating proximity to a user's body over a minimum threshold region, instructing the display controller to cease driving the first plurality of electrodes to produce images on the display panel.

25. The method of claim 20, further comprising:
in response to detecting self capacitance changes indicative of a predefined gesture, waking the computing device from the sleep mode.

26. The device of claim 4, wherein the at least one processor is programmed to interpret a first direction of one-dimensional touch movement detected in the self capacitance mode as a first user input and to interpret a second direction of one-dimensional touch movement detected in the self capacitance mode as a second user input different than the first user input.

27. The method of claim 20, further comprising:
interpreting a first direction of one-dimensional touch movement based on self capacitance changes as a first user input; and
interpreting a second direction of one-dimensional touch movement based on self capacitance changes as a second user input different than the first user input.

28. The device of claim 4, wherein the one-dimensional touch location information comprises touch movement information.

29. The method of claim 20, wherein the one-dimensional touch location information comprises touch movement information.

* * * * *